Patented Dec. 8, 1925.

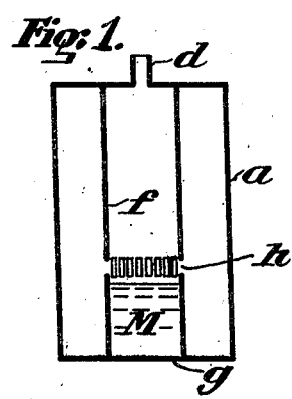
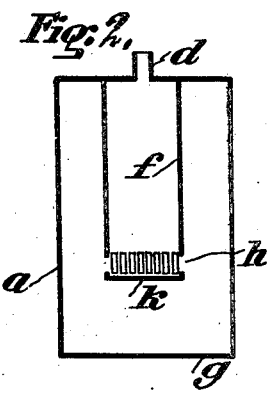
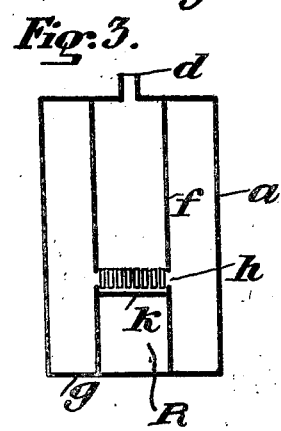
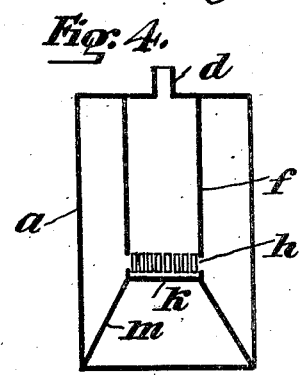

1,565,231

UNITED STATES PATENT OFFICE.

EDMUND RUMPLER AND HANS RICHTER, OF BERLIN, GERMANY; SAID RICHTER ASSIGNOR TO SAID RUMPLER.

ABSORPTION REFRIGERATING MACHINE.

Application filed July 10, 1924. Serial No. 725,293.

*To all whom it may concern:*

Be is known that we, EDMUND RUMPLER and HANS RICHTER, both citizens of the German Republic, residing at Berlin, Germany, have invented certain new and useful Improvements in Absorption Refrigerating Machines (for which we have filed an application in Germany, May 16, 1923), of which the following is a specification.

The present invention relates to an absorption refrigerating machine for intermittent working, in which only a single pipe leads to and from the generator which pipe serves both as suction and as pressure pipe.

In refrigerating machines of this type it has already been proposed to provide in the generator a cylinder, closed at the top and connected with a pipe for the refrigerating medium that is to be expelled, so that the cylinder, which is open at the bottom, does not extend to the bottom of the main reservoir. This arrangement was not, however, commercially successful, as absorption was incomplete. The gaseous refrigerating medium which passes out of the cylinder round its lower edge rises to reach the space above the liquid in the form of large bubbles. By reason of their large size the bubbles, for the greater part, are not absorbed in their passage through the liquid, but collect in gaseous form above the surface of the liquid. As the gas bubbles are not sufficiently finely broken up to be readily absorbed, no absorption actually takes place, and furthermore absorption through the surface of the liquid cannot take place when once the gases are above the level of the liquid. Furthermore, during absorption as also during the period of generation, there is produced a continuous oscillation of the levels of the two columns of liquid, which results from the large cross-sectional area at the lower edge of the cylinder, which very appreciably affects both absorption and expulsion if it does not completely stop it.

According to the invention, therefore, the generator is so constructed that the cross-sectional area of the stream of refrigerating medium passing from the cylinder into the main reservoir, is such that the refrigerating medium becomes finely divided, and it is no longer possible for the columns of liquid to oscillate. This effect is secured by closing the cylinder at its lower end and providing small holes in its lower portion, or it is secured by the cylinder being closed by means of a porous wall or a sieve-like closure member. The cross-sectional area of the passages is advantageously maintained equal to the cross-sectional area of the lower edge of the cylinder.

The invention is illustrated by way of example in the accompanying drawings in which—

The Figs. 1–4 are diagrammatical views of different forms of construction embodying the invention.

All forms of construction include an outer vessel $a$ and an inner vessel $f$. The outer vessel $a$ is entirely closed to the outside while the inner vessel $f$ near the top thereof communicates with the outside through an outlet $d$.

The characteristic feature of the invention is the form of communication between the two vessels. Heretofore, there was free unimpeded communication between the bottom or the lower portion of the inner vessel and the outer vessel.

In contradistinction to such arrangement we provide means whereby any gas passing from one of the vessels into the other is finely divided so that no rush of gas is possible.

In Fig. 1 the inner vessel $f$ extends down to the bottom of the outer vessel $a$, but intermediate its length, preferably near the bottom, there is provided a plurality of apertures $h$ establishing communication with vessel $a$. These apertures merely represent one form of construction by means of which gas passing from one of the vessels to the other is broken up into a large number of relatively small volumes and can rise in the liquid only in the form of bubbles.

The operation is as follows: The gas which is generated collects in the upper part of the main reservoir $a$ and the pressure of the gas upon the liquid in $a$ causes this liquid to pass through the holes $h$ into the cylinder $f$ until the level of the liquid in $a$ lies below the row of holes $h$. The gas then escapes through the holes $h$ and through the column of liquid in $f$ into the pipe $d$ and thence into the condenser $b$, together with the gases driven out of the liquid in $f$.

When upon the completion of the generating operation, heating is stopped and, in order to commence re-absorption, the generator $a$ is cooled, the vacuum produced in $a$ causes the column of liquid in $f$ to fall and that in $d$ to rise, so that the gases to be absorbed are able to return through the row of holes $h$ into the main reservoir $a$ and are thereby absorbed by reason of their fine state of division. In this device, however, the quantity of liquid $m$ which is in the cylinder $f$ below the row of holes $h$ does not take part in the process, as the refrigerating medium cannot be absorbed through the surface of M. To avoid this a further construction of the device is provided as shown in Fig. 2.

In Fig. 2 the ineffective body of liquid M of Fig. 1 is eliminated by so arranging the cylinder $f$ that it does not reach to the bottom of the main reservoir but is closed by a plate K below the holes $h$ which are situated at the same level as in Fig. 1. The method of operation is the same as for that illustrated in Fig. 1.

In Fig. 3 the cylinder $f$ is carried down to the floor $g$, as in Fig. 1. The part of the floor below the cylinder $f$ is, however, placed higher, at about the height of the plate K in Fig. 2 below the row of holes $h$. This form of construction has the advantage that a separate source of heat can be placed in the chamber R thus formed. This arrangement avoids the presence of the ineffective body of liquid and a direct application of heat to the cylinder $f$ is afforded with the consequence that there may be efficient expulsion.

Fig. 4 illustrates a modification of Fig. 3 in which the space below the bottom of the cylinder $f$ is defined by an outwardly flaring wall $m$ which in the form shown meets the lower edge of the outer cylinder $a$. Within the scope of the invention this space may be conical, pyramidal or semi-spherical or may have any other desired form. This form of construction permits the application of a relatively large source of heat and presents a greater heating surface.

While, in the foregoing, specific reference was made only to apertures $h$ for attaining the object of the invention, we do not wish to limit ourselves thereto. The subdivision of the gas into small bubbles may be effected by the application of a sieve or a porous or generally pervious material in the lower portion of the cylinder $f$. Such provisions would at the same time prevent oscillations of the columns of liquid.

Having now particularly described our invention, we claim as new and desire to secure by Letters Patent of the United States:

1. In an absorption refrigerator machine, a generator comprising a closed receptacle having a bottom rising toward the inside and defining a corresponding recess on the outside, a substantially vertically disposed tubular vessel within the receptacle extending upwardly centrally from the bottom of the receptacle and a fluid connection between the lower portion of the vessel and the receptacle including means for permitting gas to freely flow from the vessel into liquid in the receptacle only in small bubbles.

2. In an absorption refrigerator machine, a generator comprising a closed receptacle having a bottom rising from the edges toward the center thereby providing a downwardly flaring recess below the bottom, a substantially vertically disposed vessel within the receptacle extending centrally upwardly from the bottom of the receptacle and a fluid connection between the lower portion of the vessel and the receptacle including means for permitting gas to freely flow from the vessel into liquid in the receptacle only in small bubbles.

In testimony whereof we have affixed our signatures.

Dr. Ing. EDMUND RUMPLER.
Ing. HANS RICHTER.